United States Patent
Hümmeler et al.

(10) Patent No.: US 8,590,954 B2
(45) Date of Patent: Nov. 26, 2013

(54) SUCTION GRIPPER ASSEMBLY

(75) Inventors: Michael Hümmeler, Lennestadt (DE);
Martin Drechsler, Trunkelsberg (DE);
Kurt Waizenegger, Aitrach (DE)

(73) Assignee: Multivac Sepp Haggenmuller GmbH & Co. KG, Wolfertschwenden (DE)

( * ) Notice: Subject to any disclaimer, the term of this patent is extended or adjusted under 35 U.S.C. 154(b) by 112 days.

(21) Appl. No.: 13/238,931

(22) Filed: Sep. 21, 2011

(65) Prior Publication Data

US 2013/0038077 A1    Feb. 14, 2013

(30) Foreign Application Priority Data

Aug. 9, 2011    (EP) ..................................... 11006546

(51) Int. Cl.
*B25J 15/06* (2006.01)
*B65G 47/26* (2006.01)

(52) U.S. Cl.
USPC ..... 294/65; 198/468.3; 414/749.5; 414/752.1

(58) Field of Classification Search
USPC ............ 294/65, 184; 414/749.5, 416.02, 627, 414/737, 752.1; 198/468.3, 468.4
See application file for complete search history.

(56) References Cited

U.S. PATENT DOCUMENTS

| | | | |
|---|---|---|---|
| 3,168,204 A | | 2/1965 | Voullaire |
| 3,230,001 A | * | 1/1966 | Hirt ................ 294/184 |
| 3,506,140 A | | 4/1970 | Koch et al. |
| 3,934,920 A | | 1/1976 | Rowekamp |
| 4,199,050 A | * | 4/1980 | Moller ......................... 198/429 |
| 4,832,180 A | | 5/1989 | Ferrero |
| 4,905,456 A | | 3/1990 | Olaechea |
| 5,079,903 A | | 1/1992 | Hakansson |
| 5,575,376 A | * | 11/1996 | Colamussi ................. 198/468.3 |
| 5,743,068 A | | 4/1998 | Madariaga |
| 5,931,279 A | * | 8/1999 | Pedrotto et al. ............ 198/468.3 |
| 5,943,842 A | | 8/1999 | de Koning et al. |
| 6,641,131 B2 | * | 11/2003 | Stohr et al. ....................... 271/91 |
| 7,029,046 B2 | * | 4/2006 | Lim ................................. 294/65 |
| 7,690,706 B2 | * | 4/2010 | Wild et al. ....................... 294/65 |

FOREIGN PATENT DOCUMENTS

| | | |
|---|---|---|
| CN | 101580138 A | 11/2009 |
| DE | 8809060 U1 | 9/1989 |
| DE | 29905552 U1 | 10/1999 |
| GB | 2003824 A | 3/1979 |
| WO | 9505312 A1 | 2/1995 |

OTHER PUBLICATIONS

Extended European Search Report from the European Patent Office for European Application No. 11006546.3-2308 dated Jun. 5, 2012.

* cited by examiner

*Primary Examiner* — Dean Kramer
(74) *Attorney, Agent, or Firm* — Husch Blackwell LLP

(57) ABSTRACT

A suction gripper arrangement includes several suction gripper arms arranged in a row, which, at their lower ends, each have a suction gripper head with an abutment surface for abutting an article to be sucked onto the suction gripper head. The abutment surfaces of the suction gripper heads of the suction gripper arms neighboring each other are arranged in different planes. Moreover, the invention relates to a suction gripper arrangement in which at least one of the suction gripper arms is connected to an actuator via a lever, wherein both between the lever and the suction gripper arm, and also between the lever and the actuator, respectively, a pivot joint is formed, and wherein the lever is composed of at least to lever parts.

21 Claims, 9 Drawing Sheets

SUCTION GRIPPER ASSEMBLY

CROSS-REFERENCE TO RELATED APPLICATIONS

This application claims priority to European Patent Application No. EP 11 006 546.3 filed Aug. 9, 2011, the disclosure of which is incorporated in its entirety by reference herein.

TECHNICAL FIELD

The invention relates to a suction gripper arrangement with several suction gripper arms arranged in a row, which on their lower ends each provide a suction gripper head.

BACKGROUND

Such a suction gripper arrangement is known from U.S. Pat. No. 5,943,842 A. This suction gripper arrangement is employed to suck in a group of articles provided on a conveyor belt and lift the articles from the conveyor belt. By moving the suction gripper arrangement, the group of articles may in the following be transported and dropped again at a desired place. In the suction gripper arrangement from U.S. Pat. No. 5,943,842 A it is further already provided that the arrangement of the group of grabbed articles may be changed during the transport by the suction gripper arrangement. For this purpose, the suction gripper arms are swivably supported. Their swiveling movements may be exploited in order to decrease the distances between adjacent articles during the transport by the suction gripper arrangement. This makes it possible to insert the group of articles in smaller containers or outer packagings.

Similar suction gripper arrangements which partly also provide possibilities for changing the distances between articles of a group of grabbed articles neighboring each other come from U.S. Pat. Nos. 4,832,180, 3,934,920, 3,506,140 or 5,743,068 A.

SUMMARY

The object of the present invention is to improve a suction gripper arrangement by most simple constructive means with respect to an improved handling of the articles to be grabbed and/or with respect to a more economical operation.

In one aspect of the invention a suction gripper arrangement according to the invention is characterised in that the contact surfaces of the suction gripper heads neighboring each other are arranged in different planes, in particular in planes offset in parallel to each other and also when the suction gripper arms are aligned in parallel to each other, respectively. This offers the advantage that articles grabbed by adjacent suction gripper arms automatically lie in different planes or levels so that a later reduction of the overall volume of the group of grabbed articles is significantly facilitated by pushing adjacent articles above each other.

Preferably, the offset between the (parallel) planes of the contact surfaces of the suction gripper heads of suction gripper arms lying adjacent to each other amounts from 0.1 mm to 2.0 mm. Depending on surface and weight of the articles to be grabbed, this offset is small enough to hardly allow any differences in the suction forces to occur during suction and grabbing of the articles. Even articles, which due to the differences in height between the contact surfaces of the suction gripper heads during suction have traveled a slightly longer way, may in this manner be grabbed as equally fast and accurately positioned.

It is especially of advantage if the contact surfaces of the suction gripper heads of every second suction gripper arm lie in a common plane. This leads to each of the contact surfaces of all the suction gripper heads lying in one of overall only two different planes. In this manner differences in height between the contact heads are minimised over the entire suction gripper arrangement.

It has turned out to be especially practical if the contact surfaces of the suction gripper heads are tilted with respect to a conveying level from which the articles are withdrawn or with respect to a level of a common base plate for at least some suction gripper arms, respectively, and in general with respect to the horizontal plane. The feature of contact surfaces of the suction gripper heads being tilted in such a way can already be of an advantage independently from the feature of contact surfaces of the suction gripper heads of suction gripper arms lying adjacent to each other in different levels. The tilted contact surfaces of the suction gripper heads ensure that also the articles being grabbed by the suction gripper heads are immediately arranged at a tilt. Especially with articles such as packaging with packaging rims, which are initially generated in a common horizontal plane, this tilted arrangement of the articles may significantly facilitate to slide adjacent rows of articles over and under each other and thereby reduce the overall volume of a group of grabbed articles.

Preferably, the contact surfaces of the suction gripper heads in this case are arranged at a tilt by approx. 2° to 10°, preferably in a range of 3° to 5°.

The invention also relates to a suction gripper arrangement with several suction gripper arms arranged in a row, in which at least one of the suction gripper arms is connected to an actuator via a lever, wherein both between the lever of the suction gripper arm, and also between the lever and the actuator, respectively, a pivot joint is formed, and wherein the lever is composed of at least two lever parts. In comparison with variants in which instead of a pivot joint e.g., only a material weakness is provided in order to form a film hinge, the suction gripper arrangement according to the invention with pivot joints has the advantage of a significantly higher stability and durability. It is to be assumed that the suction gripper arrangement according to the invention significantly less frequently suffers from material cracks and then has to be replaced. But if one of the pivot joints should weaken, not the entire suction gripper arrangement has to be replaced anymore, but it suffices to replace a lever engaging at the pivot joint. This can very easily happen in that the lever is separated into at least two lever parts and withdrawn from the suction gripper arrangement. Similarly, a new and also multi-part lever may easily be installed in the suction gripper arrangement and be assembled to a lever. In this manner the maintenance of the suction gripper arrangement becomes more cost efficient. The operation of the suction gripper arrangement is overall more economic.

The multi-part lever may be assembled especially easily if the connection between the lever parts is implemented in form of a latching connection.

Further advantages may result if the connection between the lever parts is carried out as a predetermined breaking point or as predetermined separation line. This has the advantage that in case of overloading the suction gripper arrangement, initially the lever breaks, which is anyway designed as a primary exchange part. Such a predetermined separation line thereby has the additional advantage in comparison with a predetermined breaking point that the lever is not permanently destroyed but only takes up the overload and may be assembled again afterwards.

Similar advantages may arise if at least one, preferably all of the suction gripper arms are implemented in a multi-part manner. In this way only separate parts of the suction gripper arms may be replaced as required or be withdrawn for cleaning purposes without always having to replace or clean the entire suction gripper arrangement. In an analog manner to the levers, also the joints between the parts or sections of a multi-part suction gripper arm may be designed as predetermined breaking points or as predetermined separation lines.

In order to enable a facilitated handling of the multi-parted suction gripper arms, between the different sections of a multi-parted suction gripper arm, preferably a keyless quick release fastener (as known e.g. as click-fastener for backpack belts) or a snap-on interlock is provided.

Further, it is convenient if at or in the quick or snap-on fastener a sealing is provided in order to seal the inner space of the suction gripper arm with respect to the surroundings. This has the advantage that no pressure losses may occur if through the suction gripper arms a vacuum is applied to the suction gripper heads.

For the manufacturing of the suction gripper arms, the lever and/or a common base for the suction gripper arms a sintering material has proved to be practical. Such a material has the advantage of being appropriate in the application in connection with foodstuffs and also has the further advantage that comparably complicated structures may be produced by means of sintering.

If an actuator for causing a swiveling movement of several adjacent suction arms is provided, this actuator is preferably swivably movable with respect to a non-swivable, preferably central suction gripper arm. In other words, in an uneven number of suction gripper arms arranged in a row, the middle or central suction gripper arm could be fixed whereas the outer suction gripper arms may move swivably. The actuator is then axially movable with respect to this central suction gripper arm. In this manner also the swiveling movement of the entire group of suction gripper arms becomes symmetrical.

Therein it is convenient if this actuator is movable along a guide in order to increase the precision of the swiveling movement.

Finally, more advantages arise if in at least some suction gripper arms a vacuum duct with a constant cross-section is provided since thereby pressure differences in the suction gripper arms and excessive noise generation is prevented. The cross-sections of the vacuum ducts in all the suction gripper arms are preferably constant and equal to each other. However, it is also imaginable, that, for example, at the central suction gripper arm a branching of the vacuum duct is provided in order to improve the symmetry of the suction gripper arrangement.

In the following, an advantageous embodiment of the invention is described in more detail with reference to the below drawings.

DETAILED DESCRIPTION

Similar components in the figures are provided throughout with the same reference signs.

Figure 1:
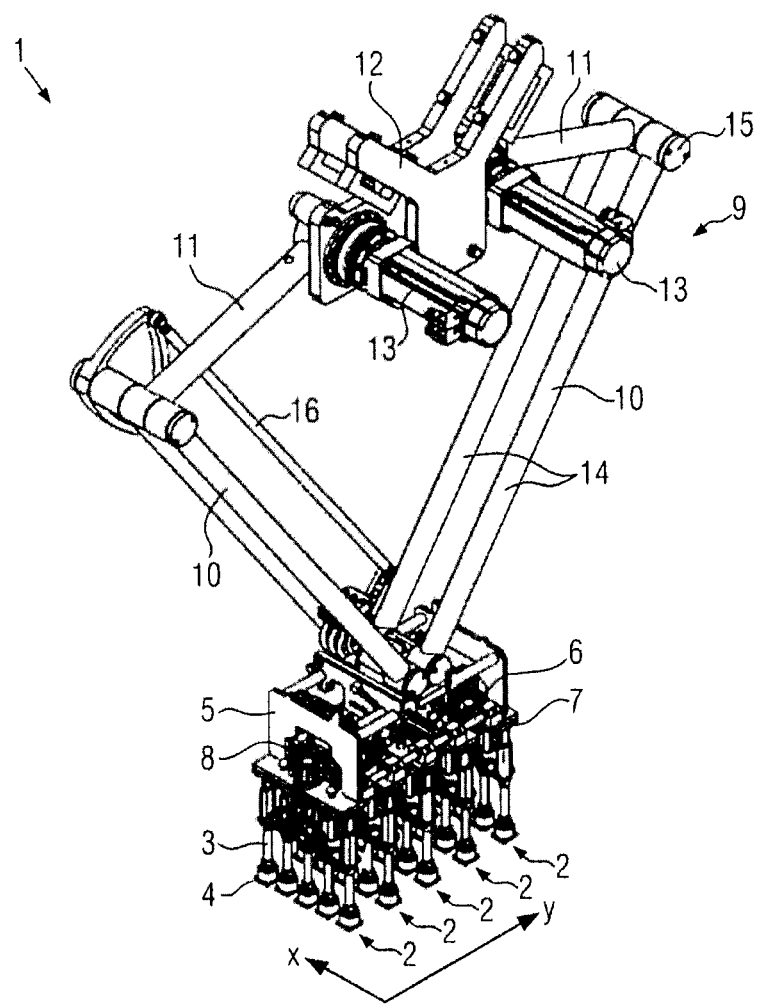
FIG. 1: shows a perspective view of a suction gripper system with five suction gripper arrangements according to the invention staggered behind each other.

FIG. 1 shows a suction gripper system 1. This suction gripper system 1 is equipped with five suction gripper arrangements 2 according to the invention which are staggered behind each other in equal distances and which in turn each have a row of five suction gripper arms 3 arranged next to each other. At each of the lower ends of the suction gripper arms 3, a suction gripper head 4 is provided to which a single article may be sucked and may be grabbed by a vacuum. The arrangement of the 5×5 suction gripper heads 4 is located at the grid points of a rectangular grid: The suction grippers 4 of a row of suction gripper arms 3 of a single suction gripper arrangement 2 lie in x-direction, while the several suction gripper arrangements 2 are staggered behind each other in y-direction.

Above the suction gripper arrangements 2 there is a rack 5 carrying the suction gripper arrangements 2. This rack 5 has at least two rods 6 arranged in parallel in y-direction. While the middle suction gripper arrangement 2 is arranged fixed in position with respect to the rods 6, a glider 7 on each of the other four suction gripper arrangements 2 is in engagement with one other rod. By the sliding of the glider 7 along the rods 6 the outer four suction gripper arrangements 2 are movable along the rods 6. By a mechanical system 8 arranged between the rods 6, it is ensured that the five suction gripper arrangements 2 are in equal distance to each other during that movement, even if the distances between two adjacent suction gripper arrangements 2 may vary.

The entire rack 5 with the suction gripper arrangements 2 is carried by a two-armed scara-robot arrangement 9. Each of the two robot arms 10 comprises a single upper arm 11 which is swivable by a rotary drive 13 fixed to a frame 12. Thereby, a single rotary drive 13 is assigned to each of the upper arms 11. Further, each of the robot arms 10 has a two-part lower arm 14. While the lower arms 14 are connected to the respective upper arm 11 by a pivot joint 15, the lower arms 14 are connected to the rack 5 at their lower ends via a pivot joint. The pivoting of the upper arms 11 by means of the rotary drives 13 effects a lifting, lowering or moving of the rack 5 at the suction gripper arrangements 2 connected thereto.

At one of the two robot arms 10, a control rod 16 is provided. It extends in parallel to the two lower arms 14 of this robot arm 10. In this manner, the control rod 16 may provide that the rack 5 is always arranged horizontal or in parallel to a conveyor belt if the robot 9 is moving.

Figure 2:
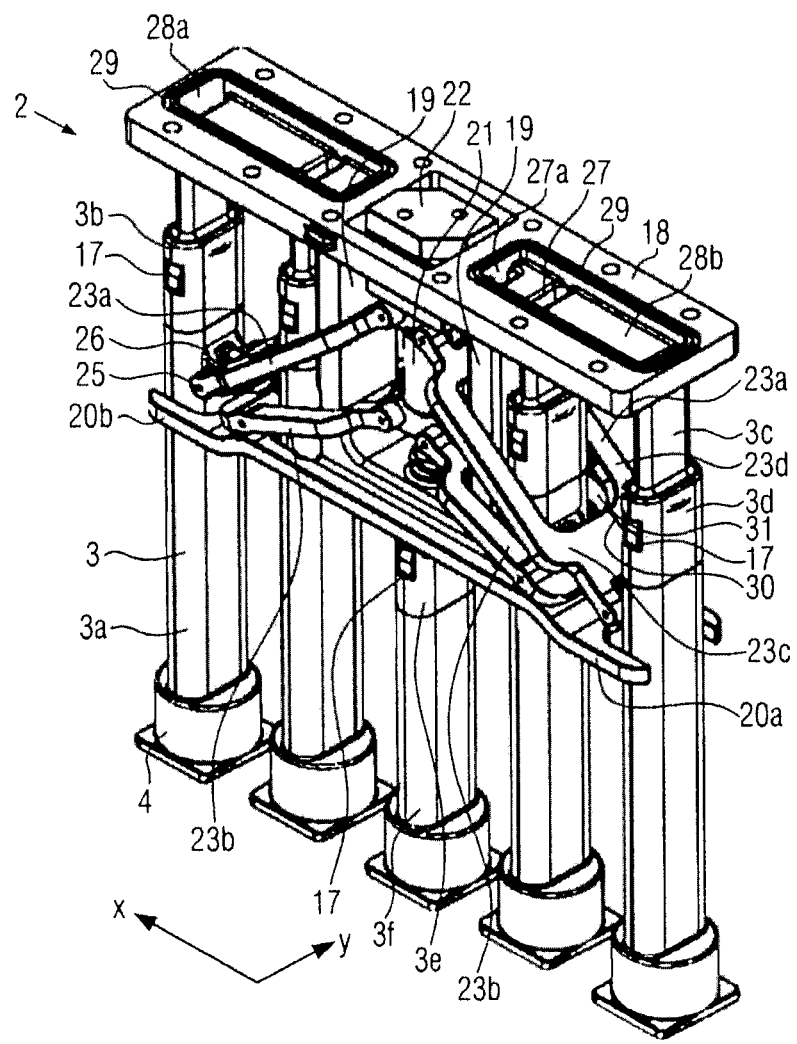
FIG. 2: shows a perspective view of a single suction gripper arrangement according to the invention.

FIG. 2 shows a single suction gripper arrangement 2. This has five suction gripper arms 3 arranged in a row behind each other in x-direction. Each of the five suction gripper arms 3 is built in a two-part built configuration. A quick fastener 17 on each of the suction gripper arms 3 serves to connect a lower section 3a of the suction gripper 3 arm to the upper section 3b. The lower section 3a thereby has an approximately oval cross-section and carries at its lower end the broader suction gripper head 4 having a circular cross-section. The upper section 3b of the four outer suction gripper arms 3 has on its side in its most upper region 3c smaller outer dimensions than in its lower region 3d. Together with a certain flexibility of the material of the suction gripper arms 3, this ensures that the outer 4 suction gripper arms are swivable around the upper region 3c. Due to the oval form of the suction gripper arms 3 and especially this upper regions 3c, a swiveling is, however, only possible in direction x, but not in direction y.

A base 18 forms the upper end of the illustrated suction gripper arrangement 2. This base 18 defines a horizontal plane. From the base 18, all five suction gripper arms extend downwardly.

Below the base 18 there is a U-formed bracket 19 between the second and the fourth suction gripper arms 3, which at its lower end has a right and a left tail 20a and 20b. The U-formed bracket 19 concentrically on its underside carries a suction gripper arm section 3e into which a lower section 3f of the central suction gripper arm 3 is latchable by a keyless quick fastener 17.

Within the U-formed bracket 19 there is an actuator 21. The actuator 21 is movable in the vertical direction via a drive flange-mounted to a plate 22 vertically movable with respect to the base 18.

Between the actuator 21 and each of the four outer suction gripper arms 3, respectively, there is a lever 23. Each of the levers 23 is supported at the actuator 21 via an inner pivot joint 24, while the opposite end of the levers 23 is connected to a cantilever 26 of one of the four outer suction gripper arms 3 via an outer pivot joint 25. The levers 23 for the most outer suction gripper arms 3 thereby lie above the levers 23b for the two inner suction gripper arms 3. The inner pivot joints of the two upper levers 23a for the most outer suction gripper arms 3 also lie at the actuator 21 above the inner pivot joint 24 of the two other levers 23b. At the most outer suction gripper arms 3 the cantilevers 26 for the outer pivot joints 25 are on the inner side, i.e., at the side facing towards the central suction gripper arm 3, while the cantilevers 26 at the second and fourth suction gripper arms 3 each lie at the other side, i.e., the side facing away from the middle suction gripper arm 3.

A vacuum duct 27 extends concentrically through each of the suction gripper arms 3, which vacuum duct 27 applies a negative pressure generated at an external vacuum source to the suction gripper heads 4. Within each of the four outer suction gripper arms 2, the vacuum duct 27 has a constant circular or oval cross-section from the top to the bottom. The central suction gripper arm 3 on its lower section 3f has a vacuum duct 27 having the same cross-section as the vacuum duct 27 within the four outer suction gripper arms 3. Within the central suction gripper arm 3, however, the vacuum duct 27 branches towards the top such that through each of the two arms of the U-formed bracket 19, a separate vacuum duct 27a is guided respectively with half of the cross-sectional area of the vacuum duct 27.

At each side of the base 18, an indentation or manifold 28a, 28b is provided. In each of the manifolds 28a, 28b, the vacuum ducts 27 of the two outer suction gripper arms 3 and one of the two vacuum ducts 27a with half of the cross-sectional area for the central suction gripper arm 3 are joined such that at the bases 18 overall only two vacuum ducts have to be plugged in. A sealing element may be inserted into an annular groove 29 of the manifolds 28a, 28b in order to seal up the vacuum ducts 27.

A separation line 30 indicates that each of the levers 23 is constructed in a two-part manner, namely with a first part 23c and a complementary part 23d. The lever parts 23c, 23d may be plugged into each other via a plug connection and especially a latching connection. Together, they form a lever 23, which has a concentrical opening 31, respectively, which is traversed by the second, the fourth suction gripper arm 3 and a vertical section of the U-formed bow 19. The separation line 30 can be designed as a predetermined breaking point or as a predetermined separation line 30, along which the lever parts 23c, 23d separate from each other if the load on the suction gripper arrangement 2 and especially on the levers 23 exceeds a certain value.

It is especially of advantage if the plug connection or latching connection is plugged together in a direction transverse to the longitudinal direction of the lever. This ensures that the lever in its longitudinal direction may transfer particularly high traction or compression forces while on the other hand, in the event of high forces in a transverse direction it serves as a predefined breaking element and is separated at the separation line 30. For strengthening the plug-connection at the separation line, also pins, e.g., metal pins, could be provided which on their part extend transversely to the longitudinal direction of the lever 23.

Figure 3:
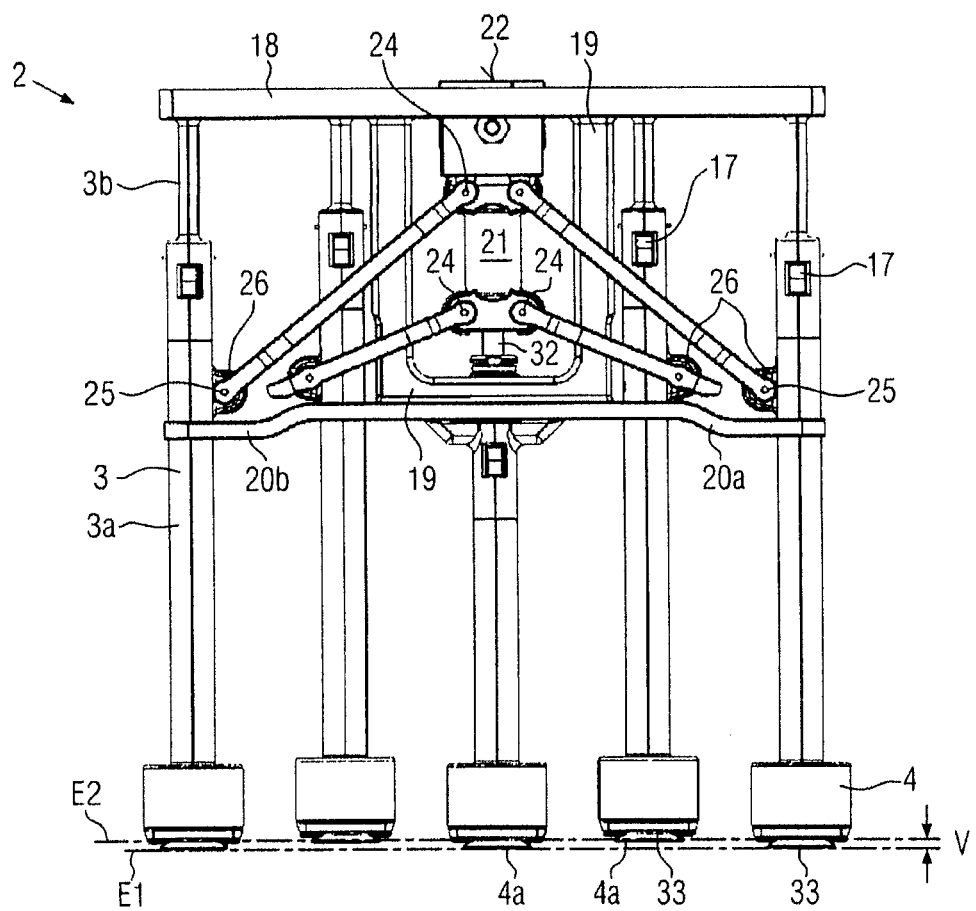
FIG. 3: shows a front view of the suction gripper arrangement.

FIG. 3 shows the suction gripper arrangement 2 in a front view. Here it especially becomes apparent that the actuator 21 is movably supported on a guide 32, such that it may axially move up and down with respect to the suction gripper arm 3. In the present exemplary embodiment, the guide 32 is a rod arranged vertically, which is fastened at the inner side of the U-formed bracket 19 and on which the actuator 21 glides. Thereby, the vertical movement of the actuator 21 is particularly more precise in comparison to not having such guide.

At the lower ends of the suction gripper heads 4 there are planar abutment surfaces 33, respectively, onto which an article to be grabbed may abut with a preferably likewise planar surface. It becomes apparent from FIG. 3 that in a suction gripper arrangement 2 according to the invention, the abutment surfaces 33 of the suction gripper heads 4 of the suction gripper arms 3 lying adjacent to each other are not in the same but in different planes, if the suction gripper arms 3 are arranged in parallel to each other or when the planes are arranged in parallel to each other.

The abutment surfaces 33 of the suction gripper heads of the central and the two outer suction gripper arms 3 are arranged in a first plane E1 which is illustrated by a dash and a dotted line. The abutment surfaces 33 of the suction gripper heads of the two other suction gripper arms 3, i.e., the second and the fourth suction gripper 3, on the other hand, are located in another plane E2, which is illustrated by a dashed line. The first plane E1 lies lower than the second plane E2 by an offset V. The offset V between these planes amounts from 0.1 mm to 2.0 mm, e.g., 1.0 mm. It is also remarkable that at the suction gripper arrangement 2 shown in FIG. 3, the abutment surfaces 33 of the suction gripper heads 4 of each of the second suction gripper arms 3 lie in a common plane E1 and E2.

Within each suction gripper head 4, there is a flexible, approximately accordion like suction spout 4a. This spout juts downwardly above the abutment surface 33. The suction spout 4a may thereby especially jut downwardly beyond the transport plane, in which the surface of the article to be grabbed is located. When putting the suction spout 4a onto the article to be grabbed, the suction spout 4a is already compressed. When applying the negative pressure to the suction gripper heads 4, the suction spout 4a pulls itself into the suction head 4 until the article with its surface gets into an abutment with the abutment surface 33 of the suction gripper head 4.

Figure 4:
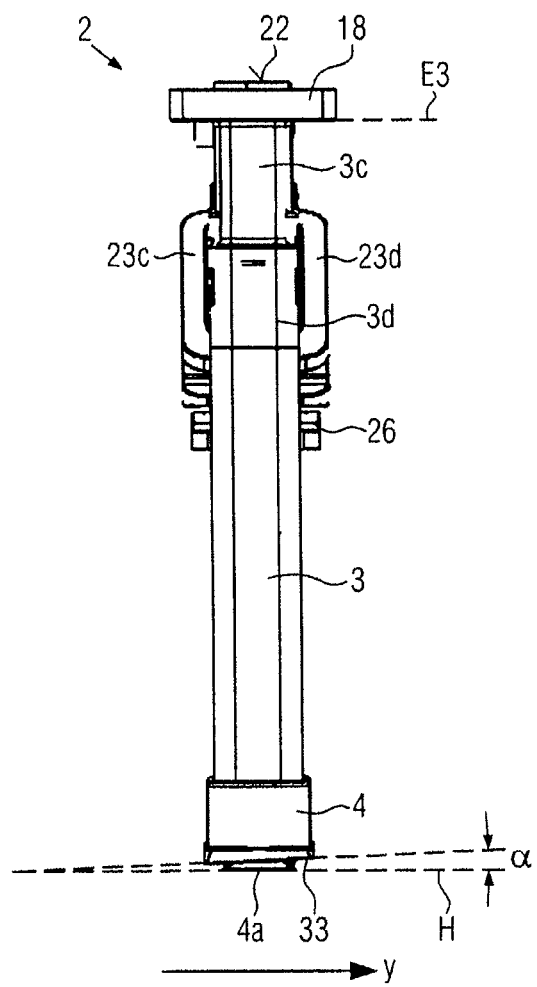
FIG. 4: shows a side view of a suction gripper arrangement.

FIG. 4 shows the suction gripper arrangement 2 in a side view. Now it is evident that the abutment surface 33 of the suction gripper heads 4 does not lie within a horizontal plane, but is tilted with respect to the horizontal H at an angle α in the y-direction. This tilting angle α may have a value of e.g., from 3° to 10°, preferably about 5°. The horizontal H may be a plane (preferably the transport plane), in which the articles to be grabbed are manufactured and from which they are grabbed by the suction gripper heads 4. The tilting angle α of the abutment plane 33, however, does not have to be measured with respect to the transport plane H but may as well be measured within the suction gripper arrangement 2 with respect to a plane E3 defined by the base 18.

It is also to be seen in FIG. 4 that the suction spout 4a projects downwardly beyond the abutment plane 33. The lower rim of the suction spout 4a is thereby located in the conveying or transport plane H; it may, however, also be jutting downwardly beyond this plane H.

Figure 5:
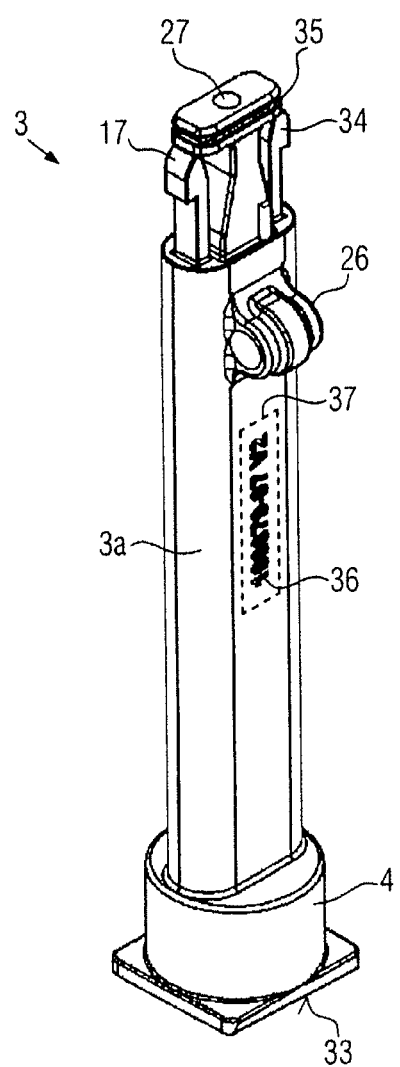
FIG. 5: shows a perspective view of an isolated lower section of a suction gripper arm.

FIG. 5 shows the lower section 3a of the two outer suction arms 3 in a perspective view. Here, especially the cantilever 26 at which the outer pivot joint 25 with the assigned lever 23 is formed can be seen. Further, the keyless quick fastener 17 with two lateral latching hooks 34 can be seen, which may snap into a respective opening in the upper section 3b of the suction gripper arms 3. A sealing 35 ensures that after the insertion of the lower section 3a into the upper section 3b of the respective suction gripper arm 3, the vacuum duct 24 within the inner space of the suction gripper arms 3 is hermetically sealed with respect to the surroundings.

Moreover, in FIG. 5, an inscription 36 of the suction gripper arms by an individual serial number is to be seen, in the present case by the serial number "100 679-07 V2". This inscription 36 is provided as protrusion or an indentation at a flat side wall of the lower section 3a of the suction gripper arm 3. Corresponding inscriptions may also be provided on all other components of the suction gripper arrangement 2.

If the suction gripper arm 3 is a component manufactured by laser sintering, this inscription 36 may preferably already be generated during the sintering process. In such a particularly advantageous variant of the manufacturing process for the components of the suction gripper arrangement 2, the CAD-data do not have even to be altered. Instead, in these CAD-data, a two- or three-dimensional inscription field 37 for applying the serial number onto the designated component may be provided. The design or control program of the laser-sintering machine now automatically generates a serial number, which in the following is generated in the inscription field 37 during laser-sintering. Consequently, the inscription 36 is automatically generated by the manufacturing machine during the sintering process. Even if the design data are not altered for this step and the single components otherwise are identical, they differ from each other by the individual inscription 36.

Figure 6:
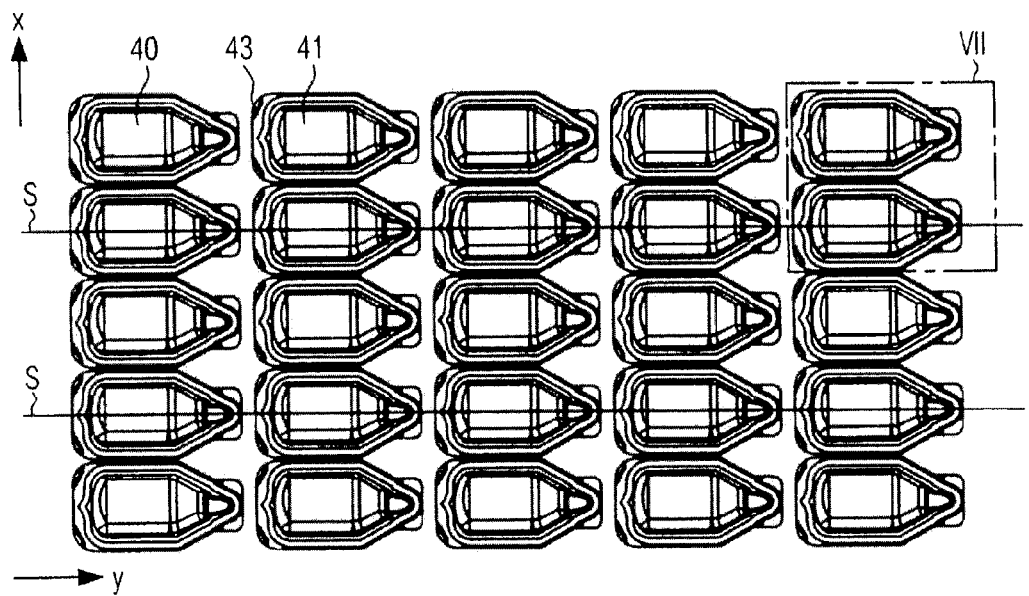
FIG. 6: shows a top view of a group of 5×5 articles to be grabbed before the grabbing.

FIG. 6 shows a field of 5×5 articles 40 to be grabbed. In the following exemplary embodiment, the articles 40 are packagings, especially so called dip-and-squeeze-packagings for pasty products such as mayonnaise or ketchup. These packagings are manufactured in that in a deep-drawing packaging machine, packaging depressions 41 are deep-drawn into a bottom web, which in the following are filled with a product and are closed in a known manner with a planar lid foil. Each of the packagings 40 has a rim 43, which lies in a common plane with the lid foil.

FIG. 6 shows articles 40 in a common horizontal transport plane H in a situation directly after they have been cut out from the common film web by a compound die tool. Between two adjacent packagings 40 there are distances both in x-direction and in y-direction.

Figure 7:
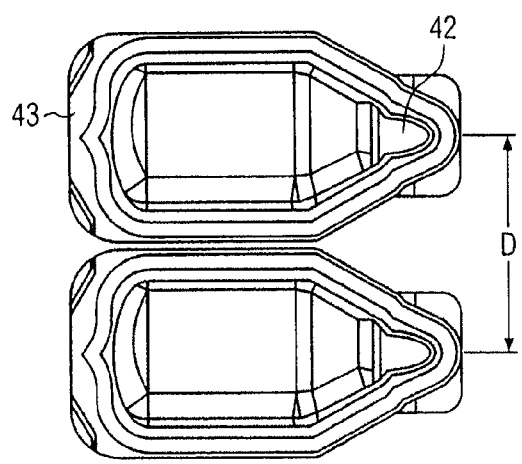
FIG. 7: shows a magnification from FIG. 6.

FIG. 7 shows a magnification of the section denoted with VII in FIG. 6. A distance D in x-direction between comparable elements (such as a grommet or nozzle 42) at adjacent packagings 40 may amount to e.g. about 50 millimeters.

Figure 8:
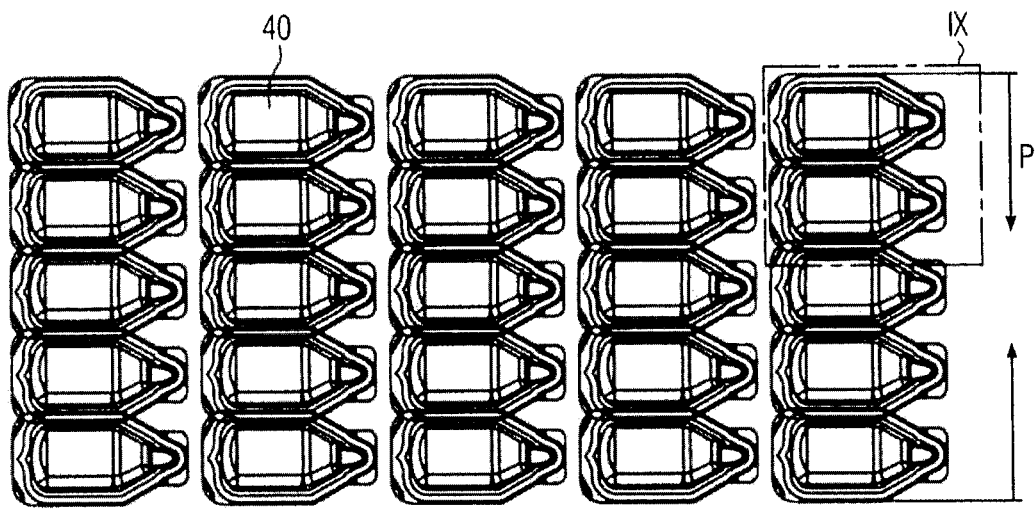
FIG. 8: shows the grabbed articles after the generation of an overlapping of adjacent articles in a first direction.

FIG. 8 shows a front view of the group of five×five packagings 40 after they have been grabbed by the suction gripper system 1. Each of the rows staggered in y-direction behind each other of packagings 40 lying next to each other in x-direction was grabbed by means of its own suction gripper arrangement 2. The arrows P depicted in FIG. 8 indicate that the distances between packagings 40 adjacent to each other in x-direction have been decreased.

Figure 9:
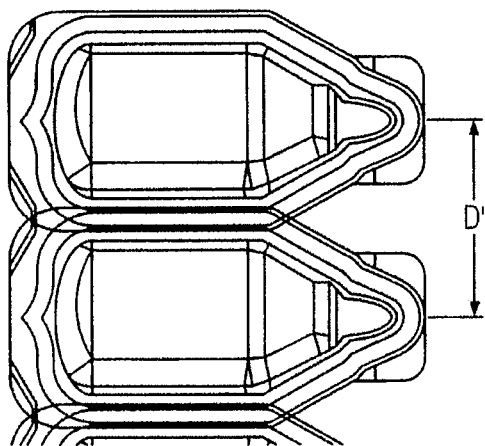
FIG. 9: shows a magnification from FIG. 8, FIG. 10: shows a group of articles after the generation of an overlapping also in a second direction.

This is also to be seen in FIG. 9, which illustrates the section denoted with IX in FIG. 8 in a magnification. The distance D' between the tips of the grommets 42 of packagings 40 neighboring each other here amounts to e.g. only 43 millimeters. The overlapping of packagings 40 neighboring each other in x-direction is enabled in that the tracks or lanes S1, S2 of the packagings 40 emphasized in FIG. 6 by the solid lines, i.e. the second and the fourth lanes from above, lie slightly higher than the packagings in the remaining lanes because of the different heights of the abutment surfaces 33 of the suction heads 4, see explanations with regard to FIG. 3. The decrease in the distances between the packagings up to and overlapping in x-direction is achieved by the swiveling of the suction gripper arms 3 of a suction gripper arrangement towards each other, in that the actuator 21 is lifted upwardly by its drive and via the levers 23, the four outer suction gripper arms 3 are brought to a swiveling movement towards the interior.

Figure 10:
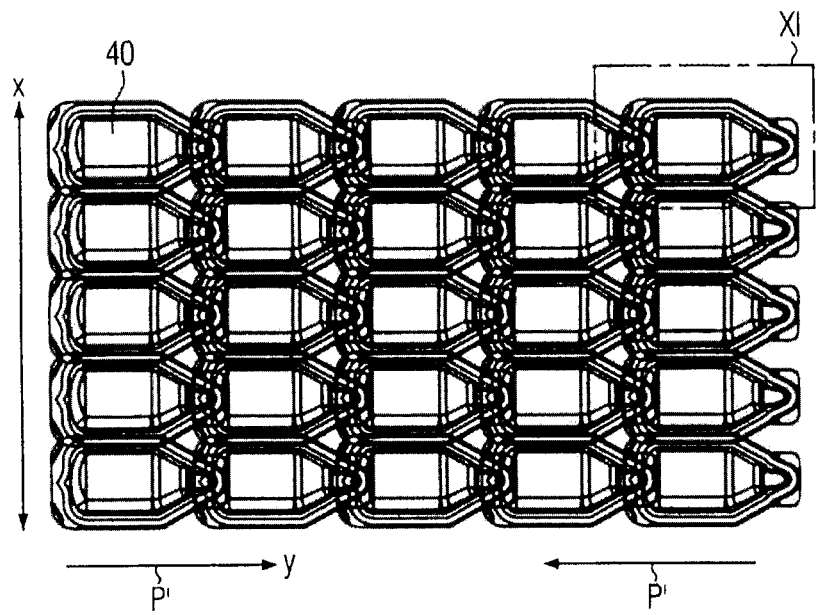

FIG. 10 shows the field or array of five×five articles or packagings 40 respectively, after the five lanes of articles 40 now also have been overlapped in the y-direction. For this purpose, the packagings 40 are slid above each other in the y-direction, in the direction indicated by the two arrows P'. This happens in that the five suction gripper arrangements 2 (see FIG. 1) are pushed along the guiding rods 6 in the rack 5 towards each other. In detail, the two respective outer suction gripper arrangements 2 are pushed towards the stationary central suction gripper arrangement 2.

Figure 11:
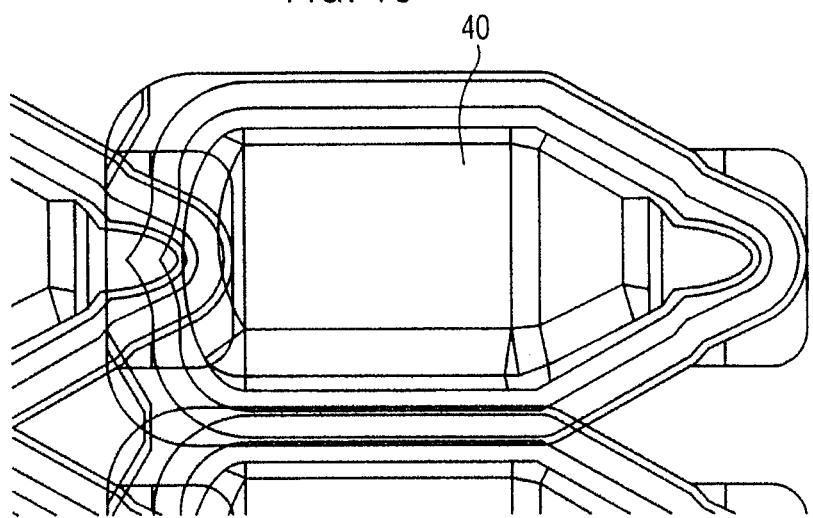
FIG. 11: shows a magnification of FIG. 10, FIG. 12: shows a horizontal view of the other group of articles transverse to a transport direction.

Now it comes into effect that the abutment surfaces 33 of the suction gripper heads 4 are tilted with respect to the horizontal H, as illustrated in FIG. 4. Because of this tilting, the articles 40 sucked in by the suction gripper heads 4 also arrange each other under a slight tilting with respect to the horizontal H. This prevents that the rims 43 of the packagings 40 of lanes of articles lying adjacent to each other may collide, if the suction gripper arrangements 2 are driven towards each other. The tilting of the articles 40 rather ensures that the rims 43 are pushed from one lane of packagings 40 in the region of the grommets 42 of the packagings above the subsequent lane of packagings 40, such that the packagings 40 overlap each other. This is especially evident in the magnification in FIG. 11, which illustrates the section denoted with XI in FIG. 10.

Figure 12:
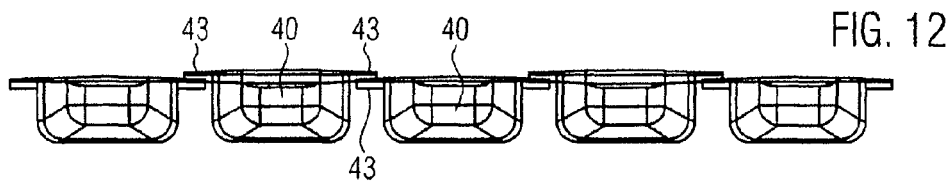

FIG. 12 shows a side view of a group of five articles 40 which have been grabbed by a five headed suction gripper arrangement 2 and have been pushed above each other in the manner shown in FIG. 8 by the swiveling of the suction gripper arms 3. Due to the offset V between the planes E1, E2 of the abutment surfaces 33 of the suction gripper heads 4, the rims 43 of the second and the fourth packaging 40 thereby lie on the rims 43 of the respective adjacent packagings 40.

Figure 13:
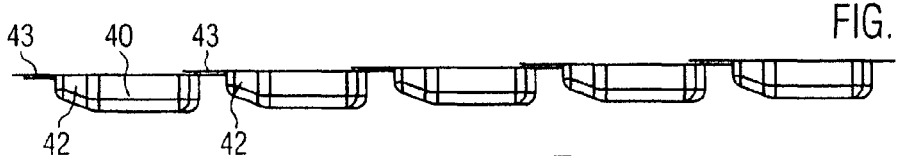
FIG. 13: shows a side view of the group of articles in the transport direction.

FIG. 13 shows a row of packagings 40 in a viewing direction opposite to the x-direction. After the lanes of the packagings 40 have been pushed together in the manner shown in FIG. 10 by driving the different suction gripper arrangements 2 towards each other, the adjacent packagings 40 overlap each other in the region of the rims 43 of their grommets 42. Generating this overlapping is promoted by the slight tilting of the articles 40, which receive this tilting by the tilting of the abutment surfaces 33 of the suction gripper heads 4.

Figure 14:
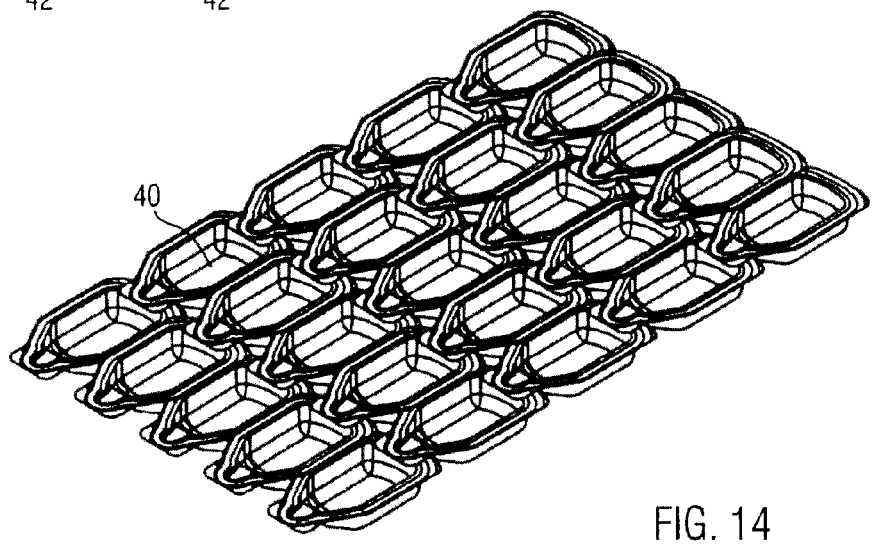
FIG. 14: shows a perspective view of the articles overlapping in two spatial directions and, FIG. 15: shows a magnified section from FIG. 14.

FIG. 14 shows the entire array of five×five packagings 40 in a perspective view after the compression in the x- and y-direction.

Figure 15:
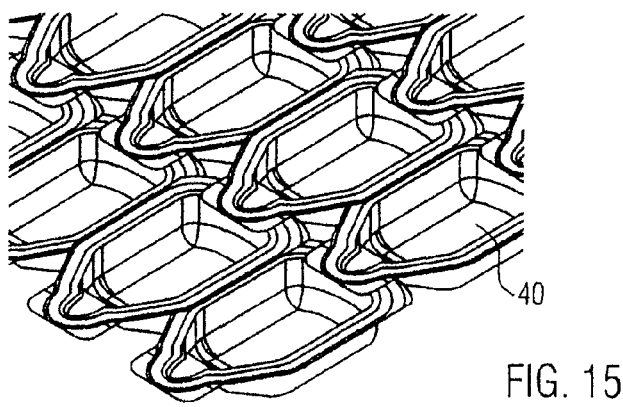

FIG. 15 shows the front edge of the array of five×five packagings in a magnification shown in FIG. 14. Here it is clearly to be seen in which manner adjacent packagings 40 overlap each other such that the overall outer dimensions of the entire field of 5×5 packagings becomes minimal.

Based on the illustrated exemplary embodiment, the suction gripper system 1 and the suction gripper arrangement 2 according to the invention may be altered in many ways. For example, it is imaginable that each suction gripper arrangement 2 does not have five, but any desired other number of suction gripper arms 3 with suction gripper heads 4. It is not mandatory, either, that the entire suction gripper system 1 has five suction gripper arrangements 2. Rather, only one suction gripper arrangement 2 or a desired number of suction gripper arrangements 2 could also be provided.

It is also to be noted that the invention comprises a number of features which not only in combination with each other, but also independently from each other are of advantage and thus may be a separate invention. This applies especially to the offset V between the abutment surfaces 33 of suction gripper heads 3 lying adjacent to each other, the multi-part configuration (especially two-part configuration) of the lever 23 and/or the suction gripper arms 3, the precise vertical movability of the central actuator 21, especially along the guide 32, the keyless rapid locking fastener 17 for the suction gripper arms 3, the sealing of the multi-part suction gripper arms 3 by means of the sealing 35, the uniform and constant cross-section of the vacuum ducts 27 through the suction gripper arms 3 as well as the tilting of the abutment surfaces 33 of the suction gripper heads 4 with respect to the horizontal H. Each of these features may establish an invention both individually and in a desired combination.

The invention claimed is:

1. A suction gripper arrangement comprising:
multiple suction gripper arms arranged in a row, which at their lower ends each comprise a suction gripper head with an abutment surface for abutting an article to be sucked onto the suction gripper head, wherein the abutment surfaces of the suction gripper heads of the suction gripper arms adjacent to each other are arranged in different planes;
wherein at least one suction gripper arm has a multi-part configuration; and
wherein the at least one suction gripper arm includes a keyless quick fastener or latching fastener provided between different sections of the multi-part configuration.

2. The suction gripper arrangement according to claim 1 wherein an offset between the planes of the abutment surfaces of the suction gripper heads of the suction gripper arms adjacent to each other has a value from 0.1 mm to 2.0 mm.

3. The suction gripper arrangement according to claim 1 wherein the abutment surfaces of the suction gripper heads of each second suction gripper arm lie in a common plane.

4. The suction gripper arrangement according to claim 1 wherein the abutment surfaces of the suction gripper heads are tilted with respect to a transport plane from which the articles are withdrawable, or with respect to a plane of a base which is common for at least some suction gripper arms.

5. The suction gripper arrangement according to claim 4 wherein the abutment surfaces are each tilted at an angle of approximately 2° to 10°.

6. The suction gripper arrangement according to claim 1 further comprising an actuator and a lever pivotally connected to the actuator and pivotally connected to one of the suction gripper arms, wherein the lever comprises at least two lever parts assembled together.

7. The suction gripper arrangement according to claim 6 wherein the connection between the lever parts is designed as a predefined breaking point or predefined separation point.

8. The suction gripper arrangement according to claim 1 wherein at or within the quick fastener or latching fastener a sealing is provided for sealing an inner space of the at least one suction gripper arm with respect to the surroundings.

9. The suction gripper arrangement according to claim 1 further comprising a base from which the suction gripper arms extend, and a lever connected to one of the suction gripper arms, wherein the suction gripper arms, the lever and/or the base are/is comprised of a sinter-compound.

10. The suction gripper arrangement according to claim 9 wherein at least one of the components of the suction gripper arrangement being comprised of the sinter-compound is provided with an inscription generated during the sintering-process.

11. The suction gripper arrangement according to claim 1 further comprising an actuator connected to several of the suction gripper arms, wherein the actuator is axially movable for effecting a swiveling movement of the several suction gripper arms with respect to a non-swivable gripper arm.

12. The suction gripper arrangement according to claim 11 further comprising a guide associated with the actuator, wherein the actuator is movable along the guide.

13. The suction gripper arrangement according to claim 1 wherein in at least some of the suction gripper arms a vacuum duct having a constant cross-section is provided.

14. A suction gripper arrangement comprising:
multiple gripper arms arranged in a row, each gripper arm having a lower end with a suction gripper head;
an actuator; and
a lever pivotally connected to the actuator and pivotally connected to one of the suction gripper arms, wherein the lever includes at least two lever parts connected together;
wherein at least one suction gripper arm has a multi-part configuration and wherein the at least one suction gripper arm includes a keyless quick fastener or latching fastener provided between different sections of the multi-part configuration.

15. The suction gripper arrangement according to claim 14 wherein the connection between the lever parts is designed as a predefined breaking point or predefined separation point.

16. The suction gripper arrangement according to claim 14 wherein, at or within the quick fastener or latching fastener, a sealing is provided for sealing an inner space of the at least one suction gripper arm with respect to the surroundings.

17. The suction gripper arrangement according to claim 14 further comprising a base from which the suction gripper arms extend, wherein the suction gripper arms, the lever and/or the base are/is comprised of a sinter-compound.

18. The suction gripper arrangement according to claim 17 wherein at least one of the components of the suction gripper arrangement being comprised of the sinter-compound is provided with an inscription generated during the sintering-process.

19. The suction gripper arrangement according to claim 14 wherein the actuator is connected to several of the suction gripper arms, and wherein the actuator is axially movable for effecting a swiveling movement of the several suction gripper arms with respect to a non-swivable gripper arm.

20. The suction gripper arrangement according to claim 19 further comprising a guide associated with the actuator, wherein the actuator is movable along the guide.

21. The suction gripper arrangement according to claim 14 wherein in at least some of the suction gripper arms a vacuum duct having a constant cross-section is provided.

* * * * *